No. 858,252.
PATENTED JUNE 25, 1907.
O. S. ATTERHOLT.
BOWL.
APPLICATION FILED NOV. 6, 1906.
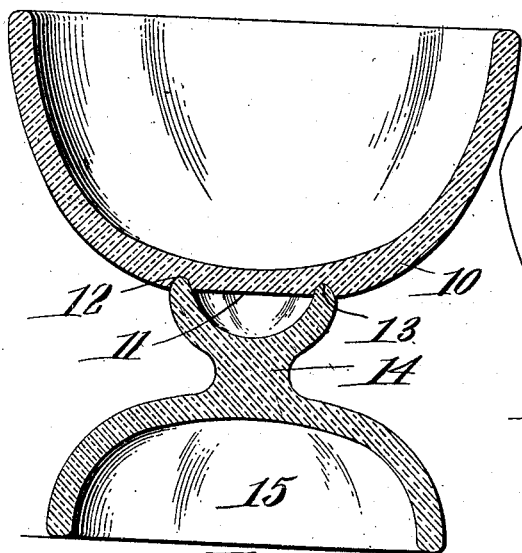
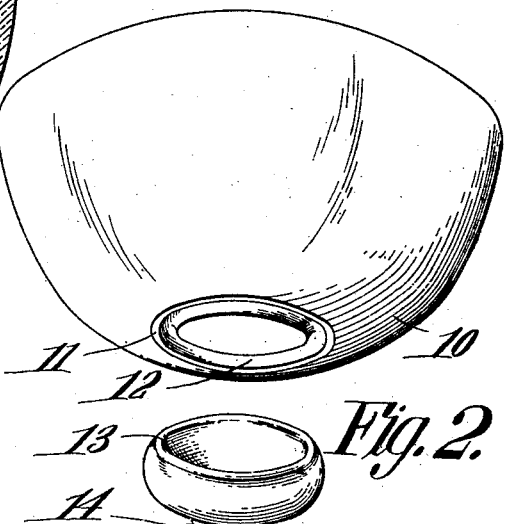
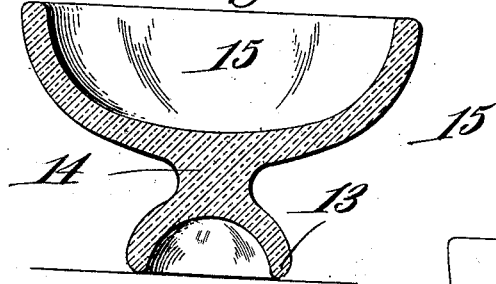
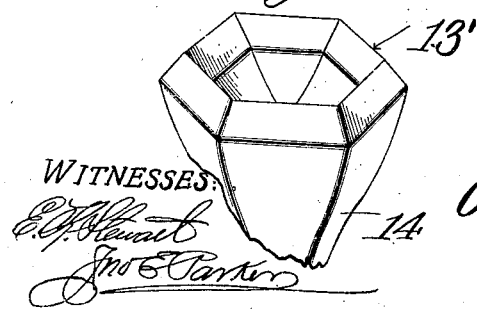
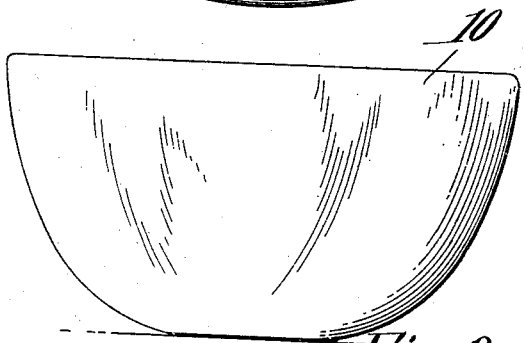
Oliver S. Atterholt, INVENTOR
By C. A. Snow & Co.
ATTORNEYS

UNITED STATES PATENT OFFICE.

OLIVER SHALLENBERGER ATTERHOLT, OF JERMYN, PENNSYLVANIA.

BOWL.

No. 858,252.  Specification of Letters Patent.  Patented June 25, 1907.

Application filed November 6, 1906. Serial No. 342,264.

*To all whom it may concern:*

Be it known that I, OLIVER SHALLENBERGER ATTERHOLT, a citizen of the United States, residing at Jermyn, in the county of Lackawanna and State of Pennsylvania, have invented a new and useful Bowl, of which the following is a specification.

This invention relates to punch bowls, and has for its principal object to provide a glass bowl of novel construction which may be used either with or without a base or stand, the bowl and base being formed of separate and readily detachable members, so that the bowl may be lifted off and allowed to rest directly on a table or other supporting surface.

A further object of the invention is to provide a device of this class in which the base or standard is of such construction as to permit its use as a compote when reversed.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a sectional elevation of a bowl and stand constructed in accordance with the invention. Fig. 2 is a detail perspective view of the bowl and stand detached. Fig. 3 is an elevation of the bowl proper with the stand removed. Fig. 4 is a vertical sectional view showing the base reversed for use as a compote. Fig. 5 is a detail view of the upper portion of the base showing a slightly modified construction in which the rib is polygonal in form.

Similar numerals of reference are employed to indicate corresponding parts throughout the several figures of the drawings.

The bowl 10 is formed of cut, pressed or blown glass, and is provided with a substantially flat bottom portion 11, so that it may rest directly upon a table or other supporting surface, and in the bottom of the bowl there is an annular groove 12 that is arranged to receive an annular rib 13 formed at the top of a base or stand 14.

The lower portion of the base or support is in the form of an inverted bowl 15, and when the main bowl is removed and the base inverted as shown in Fig. 4, this smaller bowl 15 may be used as a compote.

Both the bowl and its base or stand are formed of glass and ordinarily the bowl rests on top of the stand as shown in Fig. 1, but in some cases it becomes desirable to use the bowl alone, and in such cases the flat bottom 11 permits the placing of the bowl on a table or other support, without danger of overturning.

In Fig. 5 there is shown the upper portion of the base member, said base member in this instance being provided with a rib 13' that is polygonal instead of circular in form, it being understood that the groove and rib may be of any angular or polygonal form, as well as circular, without departing from the invention.

From the foregoing it will be seen that the composite vessel consists of two separable members having independent bases constructed to be arranged in engaging relation, and one of such vessels being reversible, while the other, which is designed to perform a useful function in only one position may be considered as non-reversible, but which nevertheless is capable of performing its function independently of the other member as well as in co-operation therewith.

I claim:—

1. In combination, a bowl having a flat base, an invertible compote having a bowl and a base, the base portions having interfitting ribs and grooves held together by the weight of the bowl, such ribs and grooves positioned to hold the members against independent lateral movement.

2. A bowl having a flat base in which a groove is formed, the groove being polygonal in contour, and an invertible compote, the base of which is provided with a polygonal rib adapted to enter said groove when the compote is used as a stand for the bowl, the interfitting rib and groove serving to prevent independent rotative or lateral movement of the members.

3. A composite vessel comprising a bowl, and a compote having their base portions of approximately co-extensive area, the base portions having interfitting ribs and grooves held together by the weight of the upper vessel, such ribs and grooves positioned to hold the members against independent lateral movement.

In testimony that I claim the foregoing as my own, I have hereto affixed my signature in the presence of two witnesses.

OLIVER SHALLENBERGER ATTERHOLT.

Witnesses:
  H. D. CAREY,
  MARY E. WILLIAMS.